Jan. 21, 1969   A. KATCHMAN   3,423,655

DIELECTRIC LIQUID EPOXIDE SCAVENGER

Filed Sept. 20, 1965

LIQUID DIELECTRIC
COMPRISING A
HALOGENATED
AROMATIC COMPOUND
AND AN EPOXIDIZED
POLYBUTADIENE
STABILIZER

INVENTOR:
ARTHUR KATCHMAN,

BY  *Harold A. Lurey, Jr*

HIS ATTORNEY.

United States Patent Office 3,423,655
Patented Jan. 21, 1969

3,423,655
DIELECTRIC LIQUID EPOXIDE SCAVENGER
Arthur Katchman, Glens Falls, N.Y., assignor to General
Electric Company, a corporation of New York
Filed Sept. 20, 1965, Ser. No. 488,586
U.S. Cl. 317—259     5 Claims
Int. Cl. H01g 1/00

ABSTRACT OF THE DISCLOSURE

An epoxidized polybutadiene is incorporated as a stabilizer in halogenated aromatic compounds useful as dielectric liquid impregnants, particularly for AC capacitors.

---

This invention relates to dielectric compositions comprising stabilized halogenated aromatic compounds. More specifically, it relates to dielectric material comprised of halogenated aromatic compounds and epoxidized polybutadiene, and to electrical apparatus in which such dielectric material is used.

Halogenated aromatic compounds, specifically chlorinated diphenyls and related compounds, have been extensively used in the past as dielectric media for electrical equipment, particularly electrical capacitors. A difficulty which arises in the use of halogenated aromatic compounds as dielectric media, however, is that electrical discharges, stress in the apparatus, or chemical hydrolytic attack may cause decomposition of these compounds. Halogenated products, such as hydrogen chloride, which are produced by this decomposition process, adversely affect the properties of the dielectric and have a corrosive effect on the various components of the apparatus. To overcome this problem, it has been proposed that socalled scavengers or getter materials be incorporated in the dielectric liquid for removing or neutralizing the effect of hydrogen chloride and other decomposition products. However, the known scavenger materials heretofore proposed have been small molecules that react with the halogen or halide decomposition products to form compounds which rotate, in an alternating field, causing dissipation of electrical energy. As these compounds accumulate, the power factor of the dielectric increases. Hence, the known scavenger materials for halogenated aromatic dielectrics are of less value in applications, such as electrical capacitors, where an alternating electrical potential is applied to the dielectric.

The alternating field-induced rotation of the molecules formed by the reaction of halogenated aromatic dielectric decomposition products with known scavenger materials is a result of polarization of the substituents in these molecules. This polarization is attributed to the relative size and polarity of the halogen substituents in these molecules as compared to the remaining constituents. More specifically, halogen, which tends to be negative in its combined form, imparts a negatively polar characteristic to that portion of the molecule where it is located. The opposite portion of the molecule therefore takes on a relatively positive polarity and if the size of the halogen constituents is of the same order of magnitude as that of the nonhalogen constituents, the polarization of the overall molecule is great enough to cause rotation under the influence of an externally applied alternating field.

It is an object of this invention to provide an improved halogenated aromatic dielectric composition with more stable power factor characteristics.

Another object is to provide a halogenated aromatic capacitor dielectric material with an additive which stabilizes the dielectric material as to both deterioration and power factor.

Briefly, in accordance with the present invention, the above objects are met by dielectric compositions comprising halogenated aromatic compounds and epoxidized polybutadiene.

The subject matter of the invention is particularly pointed out and distinctly claimed in the concluding portion of this specification. My invention, however, together with further objects and advantages thereof, may be better understood by reference to the following description, taken in conjunction with the accompanying drawings in which:

Figure 1:
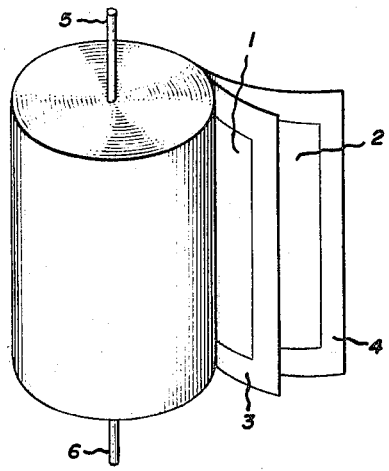
FIGURE 1 illustrates one embodiment of the present invention.

Referring now to the drawing and particularly to FIGURE 1, there is shown a rolled type capacitor comprising a pair of convolutely wound electrode foils 1 and 2 of suitable metal, such as aluminum, insulated from each other by separate sheets 3 and 4 of suitable dielectric material capable of being impregnated, such as kraft paper, plastic film, or combinations of such materials. Electrical contact to electrode foils 1 and 2 is made by terminal leads 5 and 6 of electrically conductive material which are applied to the respective foil electrodes and project from the opposite ends of the wound capacitor section.

Figure 2:
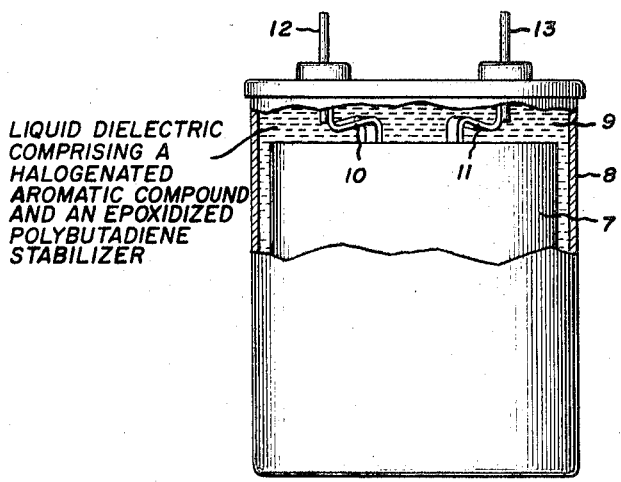
FIGURE 2 illustrates the embodiment of FIGURE 1 in assembled form.

FIGURE 2 shows a capacitor assembly in which a wound capacitor section 7, such as the wound section shown in FIGURE 1, is enclosed in a casing 8 containing a dielectric liquid 9. As shown, the dielectric liquid 9 surrounds the capacitor and impregnates the capacitor spacer material. Dielectric liquid 9 is comprised of halogenated aromatic material, such as chlorinated diphenyl and a scavenger of a composition more fully described below. A pair of tap straps 10 and 11, connected within the capacitor section to electrodes of different polarity, are respectively connected to external terminals 12 and 13 suitably mounted on the cover of the casing.

During operation of the capacitor, decomposition of the halogenated aromatic dielectric liquid may occur when the dielectric liquid is subjected to voltage stress, particularly for long periods at elevated temperatures. In accordance with the invention, halogenated aromatic dielectric liquid 9 has incorporated therein epoxidized polybutadiene as a scavenger to deactivate and neutralize the decomposition products resulting from the breakdown of the halogenated aromatic dielectric.

For the purposes of this invention, epoxidized polybutadiene is a high molecular weight butadiene polymer in which some or all of the bonds have been oxidized to the oxirane structure. An example of a high molecular weight epoxidized polybutadiene which may be used within the scope of the present invention, is a fully epoxidized polybutadiene corresponding to the following formula:

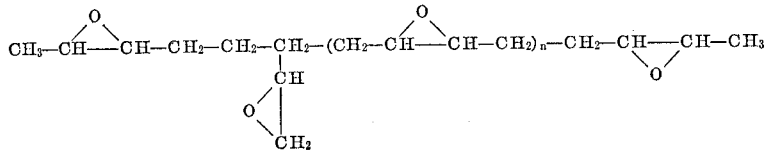

where $n$ is at least 3 but may be up to 500. In general, a molecular weight in the range from 2,000 to 10,000 is preferred. A commercially available epoxidized polybutadiene with a molecular weight of about 2,000 is obtainable from Food Machinery Corp. under the trade name Oxiron 2001.

It has been found that expoxidized polybutadiene effectively inactivates free or ionized halogen, resulting from the chemical breakdown of a halogenated aromatic dielectric material, by combining with it. The resultant molecule formed by the high molecular weight epoxidized polybutadiene combining with the generally small amount of degradation products, e.g., free or ionizable halogen, gives a combined molecule which is essentially neutral but which contains dipoles distributed randomly along the molecule. The dipole associated with the chain in order to rotate in an alternating field will have to drag with it large segments of the entire molecule. The bulkiness of the macromolecule restricts the rotation of the dipolar portion and as a consequence reduces its contribution to the dielectric loss.

Although the effectiveness of high molecular weight epoxidized polybutadiene as a stabilizer for halogenated aromatic compound dielectrics is not dependent on concentration, a concentration of the stabilizer in the range of .05 to 5% by weight of the total dielectric composition is desirable and a concentration of about 0.3–1.0% weight is preferred.

As an example of the improved characteristics obtained by the addition of epoxidized polybutadiene to a halogenated aromatic dielectric material, a test was made in which a first group of four capacitors with paper dielectric spacers were impregnated with a conventional halogenated aromatic material, specifically Pyranol 1499, a proprietary capacitor dielectric material of the General Electric Co. Pyranol 1499 may be characterized as a mixture of chlorinated diphenyl isomers with a predominant amount of trichlorodiphenyl isomer. A second group of four capacitors identical to those of the first group were impregnated with a dielectric material comprised of Pyranol 1499 and 0.3% by weight epoxidized polybutadiene. Both groups of capacitors, i.e., the first group referred to as the control samples and the second group referred to as the test samples, were life tested at 660 volts and 85° C. Periodically the temperature of the capacitors was raised to 100° C. and 125° C. and the power factor of each of the capacitors was measured at these temperatures. The results of this test are tabulated below:

| Time (hours) | Power factor measured at 100° C. | | Power factor measured at 125° C. | |
| --- | --- | --- | --- | --- |
| | Control samples, percent | Test samples, percent | Control samples, percent | Test samples, percent |
| 0 | .354 | .396 | .383 | .471 |
| 505 | .355 | .347 | .473 | .432 |
| 1,543 | .388 | .354 | .621 | .443 |
| 2,502 | | .354 | | .455 |

One of the control samples failed prior to the test at 1,543 hours and the remaining three control samples failed prior to the 2,502 hour measurement. A test sample also failed prior to the 1,543 hour test and another prior to the 2,502 hour test. The two remaining test samples functioned for an additional 1,000 hours without failing. The substantially constant power factor and extended service life of the test samples, as compared to the control samples, are attributable to the epoxidized polybutadiene stabilizer. These improvements are related since it is well known to those skilled in the art that an increase in power factor is indicative of impending failure in a capacitor.

The dielectric compositions of the present invention may be used in any electrical apparatus heretofore employing halogenated aromatic compounds as a dielectric material. It will be appreciated that the present invention is particularly advantageous to minimize power losses where the dielectric material is exposed to an alternating current such that polar decomposition products resulting from the breakdown of the halogenated aromatic compounds would rotate under the influence of the alternating electrical field.

Stabilization of halogenated aromatic capacitor dielectric material with epoxidized polybutadiene is a particularly useful application of the present invention. As illustrated above, the halogenated aromatic dielectric, along with epoxidized polybutadiene additive, may be used as an impregnant for a capacitor comprised of capacitor electrodes and a porous dielectric material. The stabilized dielectric material of the present invention may also be used in liquid form in a capacitor having electrodes separated by liquid dielectric media. In all of these embodiments, power losses in the material are decreased, power factors are stabilized, corrosive effects of halogenated decomposition products are minimized and service life is increased.

While the present invention has been described with reference to particular embodiments thereof, it will be understood that numerous modifications may be made by those skilled in the art without departing from the true spirit and scope of the invention. Therefore, the appended claims are intended to cover all such equivalent variations as come within the true spirit and scope of the invention.

What I claim as new and desire to secure by Letters Patent of the United States is:

1. The combination of an electrical device impregnated with a dielectric composition comprising a halogenated aromatic compound and a stabilizer of a high molecular weight epoxidized polybutadiene, said stabilizer having a molecular weight of from about 2,000 to 10,000 and comprising from about 0.05% to 5.0% by weight of said composition.

2. Electrical apparatus comprising a container, an electrical device in said container, and dielectric material in said container, said material comprising a halogenated aromatic dielectric material and epoxidized polybutadiene, said epoxidized polybutadiene having a molecular weight of between about 2,000 to 10,000 and comprising from about 0.05% to 5.0% by weight of said dielectric material.

3. An electrical capacitor comprising a pair of electrodes separated by solid dielectric material, and a dielectric impregnant for said dielectric material, said impregnant comprising a halogenated aromatic compound and epoxidized polybutadiene, said epoxidized polybutadiene having a molecular weight of between about 2,000 to 10,000 and comprising from about 0.05% to 5.0% by weight of said dielectric material.

4. An AC electrical capacitor, as in claim 3, wherein said solid dielectric material is comprised of at least one member from the group consisting of kraft paper and plastic film, said epoxidized polybutadiene having a molecular weight of between about 2,000 to 10,000 and comprising from about 0.05% to 5.0% by weight of said dielectric material.

5. For use as a dielectric liquid impregnant subjected to alternating current the combination comprising:
   (a) a chlorinated diphenyl dielectric liquid;
   (b) a stabilizer comprising an epoxidized polybutadiene incorporated in said dielectric liquid;
   (c) said stabilizer being a fully epoxidized polybutadiene of from about 2,000 to 10,00 molecular weight; and
   (d) said stabilizer comprising from about 0.05% to about 1.0% by weight of said dielectric liquid.

(References on following page)

References Cited

UNITED STATES PATENTS

| | | | |
|---|---|---|---|
| 2,840,627 | 6/1958 | Lewis | 174—15 X |
| 3,242,402 | 3/1966 | Stahr | 317—259 |
| 3,362,908 | 1/1968 | Polito | 252—65 |

OTHER REFERENCES

Brady: Material Handbook, 9th edition, McGraw-Hill, New York, 1963, pp. 283–284.

The Condensed Chemical Dictionary, Reinhold, New York, 1962, sixth edition, p. 837.

LEWIS H. MYERS, *Primary Examiner.*

ELLIOT A. GOLDBERG, *Assistant Examiner.*

U.S. Cl. X.R.

174—14; 252—66